(12) United States Patent
Suzuki et al.

(10) Patent No.: US 6,464,897 B1
(45) Date of Patent: Oct. 15, 2002

(54) LIQUID CRYSTAL COMPOSITION AND HEAT-SENSITIVE RECORDING MEDIUM USING THIS MATERIAL

(75) Inventors: Noaya Suzuki, Takatsuki; Shoji Kotani, Otsu; Hideaki Ueda, Kishiwada, all of (JP)

(73) Assignee: Minolta Co., Ltd., Osaka (JP)

(*) Notice: Subject to any disclaimer, the term of this patent is extended or adjusted under 35 U.S.C. 154(b) by 63 days.

(21) Appl. No.: 09/590,599

(22) Filed: Jun. 9, 2000

(30) Foreign Application Priority Data

Jun. 11, 1999 (JP) .......................... 11-164729

(51) Int. Cl.[7] .................. C09K 19/36; C09K 19/32; G03C 1/73; G11B 7/24; B41M 5/26
(52) U.S. Cl. .................. 252/299.7; 252/299.62; 349/2; 369/275.2; 430/19; 430/20; 359/3
(58) Field of Search .................. 252/299.62, 299.7; 430/20, 19; 428/1.1; 503/200; 349/2; 359/3; 369/275.2

(56) References Cited

U.S. PATENT DOCUMENTS 6,197,460 B1 * 3/2001 Tamaoki et al. ............. 430/20

* cited by examiner

*Primary Examiner*—Shean C. Wu
(74) *Attorney, Agent, or Firm*—Sidley Austin Brown & Wood LLP

(57) ABSTRACT

Cholesteric liquid crystal compositions and a recording medium which includes cholesteric liquid crystal composition are disclosed. The cholesteric liquid crystal composition has a characteristic, in a cholesteric phase, of reflecting visible light in accordance with temperature. By rapidly cooling the display from a cholesteric phase, the material can be solidified in a reflection state. The cholesteric material also has the characteristic during a transition from a solid phase to a cholesteric phase of having of an enthalpy $\Delta Hch$ at a substantially constant value during a time when a temperature thereof increases during one of differential thermal analysis and differential scanning calorimetry.

15 Claims, 5 Drawing Sheets

LIQUID CRYSTAL COMPOSITION AND HEAT-SENSITIVE RECORDING MEDIUM USING THIS MATERIAL

RELATED APPLICATIONS

This application is based on application No. 11-164729 filed in Japan, the contents of which are hereby incorporated by reference.

FIELD OF THE INVENTION

The present invention pertains to a new liquid crystal composition and to a heat-sensitive recording medium that uses this composition, wherein the heat-sensitive recording medium allows information to be written to it when particular heating conditions are present, and also exhibits reversibility, such that this information can also be erased.

BACKGROUND OF THE INVENTION

In recent years, in conjunction with the increased attention being paid to reduced resource consumption and recycling, it has been desired to enable the re-use of recording media such as paper. Technological development efforts toward this end have focused on rewritable heat-sensitive recording materials onto and from which data can be recorded and erased by means of a heating means, such as a thermal head.

Known reversible heat-sensitive recording materials include a leuco pigment/coupling control agent, an organic low-molecular weight or polymer resin matrix, or a polymer cholesteric liquid crystal composition.

A leuco pigment/coupling control agent exhibits color when the lactone ring that is contained in the leuco pigment molecule opens and loses color when the ring closes. A lactone ring opens when it is rapidly cooled after its temperature is increased, and closes when it is gradually cooled. Such a leuco pigment/coupling control agent is applied onto a sheet, so that writing may be performed using a thermal head, and the information is erased when the sheet passes through heat rollers.

Known types of organic low-molecular weight or polymer resin matrix employ BA (behenic acid) as an organic low-molecular weight compound or PVCA (polyvinyl chloride acetate) as a polymer compound. These materials can alternate between a transparent state and a light scattering state depending on the heating temperature, and are maintained in either state when cooled. When this type of material is applied onto a sheet, information can be written on it using a thermal head.

A known polymer cholesteric liquid crystal composition includes a cholesteric liquid crystal compound comprising polymerized vinyl compounds having a cholesteric liquid crystal compound on the surveying chain. The display color of this composition can be changed and fixed by heating the composition to a certain temperature above its crystallization point and then rapidly cooling it.

Certain compounds are known to comprise a low-molecular weight cholesteric liquid crystal, as shown in Adv. Mater., 1997, 9(14), pp. 1102–1104. With these materials, the display color may be changed and fixed by heating the compound to a temperature above the melting point and then cooling it rapidly.

Using a leuco pigment/coupling control agent described above, the color displayed is determined by the leuco pigment used, and display of multi-color images is not possible. Since an organic low-molecular weight/polymer resin matrix performs display based on the transmission and scattering of light, multi-color display is not possible with that material either. With polymer cholesteric liquid crystal, while it is possible in principle to change the display color based on the heating temperature, it takes up to several minutes to change color, which has posed a major obstacle to putting it to practical use. Using low-molecular weight cholesteric liquid crystal, the display color may be changed based on the heating temperature, but it has the problems that the range of temperature in which the color may be changed is small, and it has poor reproducibility.

SUMMARY OF THE INVENTION

The object of the present invention therefore is to provide a more appropriate new liquid crystal compound and composition as a reversible heat-sensitive recording material. Another object of the present invention is to provide a reversible heat-sensitive recording medium that (i) is capable of performing color display at a high speed, (ii) can change the display color in a wide range based on easy temperature control, and (iii) has good reproducibility with little chromatic unevenness.

In order to attain these objects, the present inventors have found liquid crystal compositions having an enthalpy $\Delta Hch$ that, during its transition from the solid phase to the cholesteric phase, is constant at A ($0 \leq A \leq 15$ mJ/mg) when the temperature increases during differential thermal analysis or differential scanning calorimetry. Thus, the present inventors have found that by using this liquid crystal composition as a recording layer, the temperature range of the liquid crystal composition in which it exhibits color is increased and thermal writing by means of a thermal head, etc., becomes practical.

The liquid crystal composition pertaining to the present invention comprises a liquid crystal composition that includes a cholesteric liquid crystal compound that exhibits a cholesteric phase at temperatures higher than room temperature, wherein the liquid crystal compound reflects light in the visible light range in accordance with the temperature, and solidifies in the reflective state when it is rapidly cooled, and wherein the enthalpy $\Delta Hch$ of the liquid crystal compound during its transition from the solid phase to the cholesteric phase is constant at value A ($0 \leq A \leq 15$ mJ/mg) when the temperature increases during differential thermal analysis or differential scanning calorimetry. Such a liquid crystal composition has a large temperature range in which it exhibits color and is appropriate as a recording material used in a heat-sensitive recording medium.

The heat-sensitive recording medium pertaining to the present invention comprises, for example, a sheet-like support member (base layer) and a recording layer. The recording layer comprises a liquid crystal composition including a cholesteric liquid crystal compound that exhibits a cholesteric phase when it is within a certain temperature range and reflects light in the visible light range in accordance with the temperature, and that solidifies in the reflective state when it is rapidly cooled from that temperature. Specifically, the recording layer comprises a liquid crystal composition whose enthalpy $\Delta Hch$ during its transition from the solid phase to the cholesteric phase is constant at A ($0 \leq A \leq 15$ mJ/mg) when the temperature increases during differential thermal analysis or differential scanning calorimetry.

By having such a recording layer, the heat-sensitive recording medium pertaining to the present invention can display a desired color when it is heated to the temperature required, based on the information to be recorded, and is capable of multi-color display. In addition, the displayed information may be erased when the medium is reheated. Further, various display colors are available, and little chromatic unevenness is exhibited. The temperature range in which the color may be changed is also wide and temperature control is easy.

The representative liquid crystal compounds that may be used in the present invention consist of the compounds having the chemical structures (I) through (VII) shown below. For the liquid crystal composition, these compounds may be used on their own or as a mixture of two or more, as long as the single compound or the mixture exhibits an enthalpy $\Delta Hch$ at constant A ($0 \leq A \leq 15$ mJ/mg) during its transition from the solid phase to the cholesteric phase when the temperature increases during differential thermal analysis or differential scanning calorimetry. Other ingredients, such as liquid crystal compounds other than those having the chemical structures (I) through (VII), may also be added.

When two compounds are mixed, the composition may be selected in the range between 9:1 to 1:9 by weight ratio, and in particular, a weight ratio between 1:1 and 3:1 is preferred. Furthermore, compounds that include a cholesterol radical are preferred, and those including two cholesterol radicals are most preferred.

Chemical structure (I):

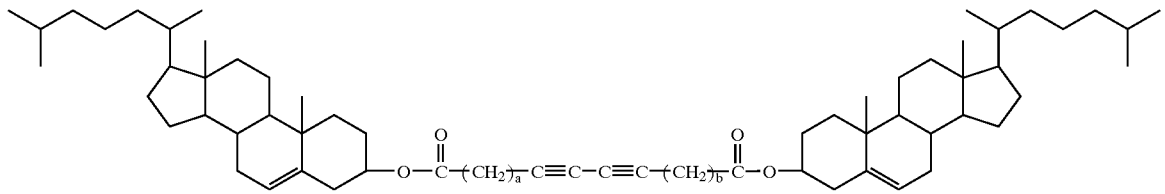

where (a) and (b) are integers such that (a+b) is 5 through 20.

Chemical structure (II):

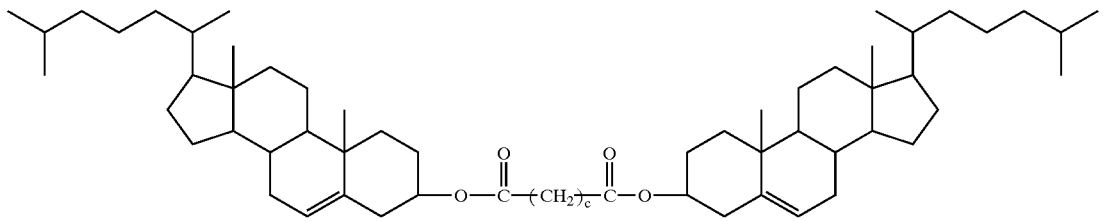

where (c) indicates an integer 5 through 20.

Chemical structure (III):

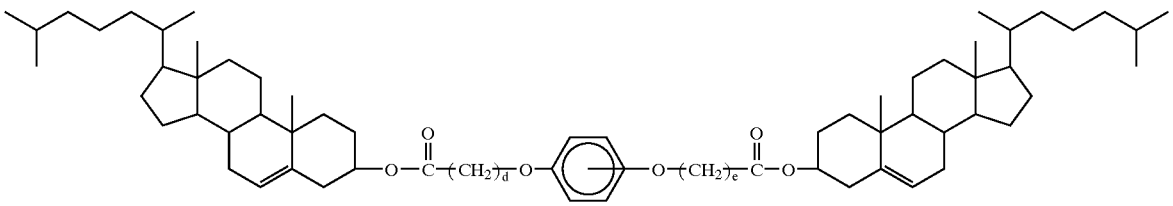

where (d) and (e) are integers such that (d+e) is 5 through 20.

Chemical structure (IV):

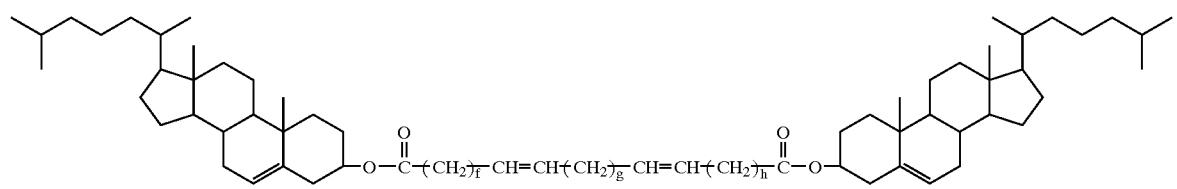

where (f), (g) and (h) are integers such that (f+g+h) is 5 through 20.

Chemical structure (V):

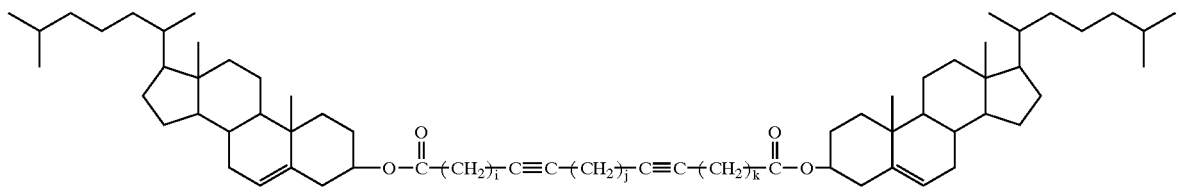

where (i), (j) and (k) are integers such that (i+j+k) is 5 through 20, excluding the case where (j) is 0.

Chemical structure (VI):

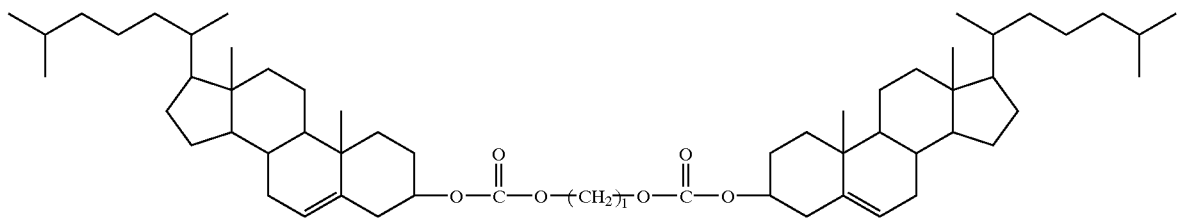

where (l) indicates an integer 5 through 20.

Chemical structure (VII):

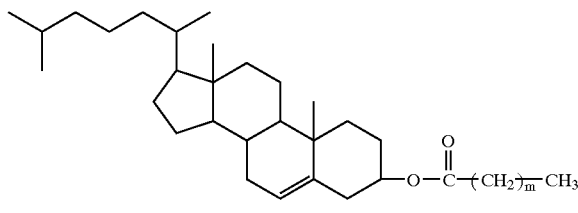

where (m) indicates an integer 5 through 20.

Specific examples of the chemical structures (I) through (VII) above include the following compounds having the structures (A) through (N).

Chemical Structure (A):

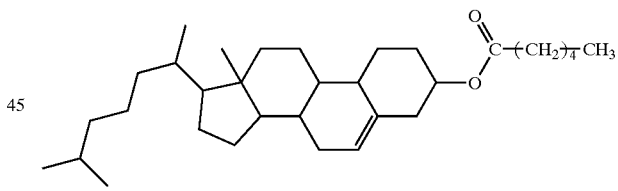

Chemical Structure (B):

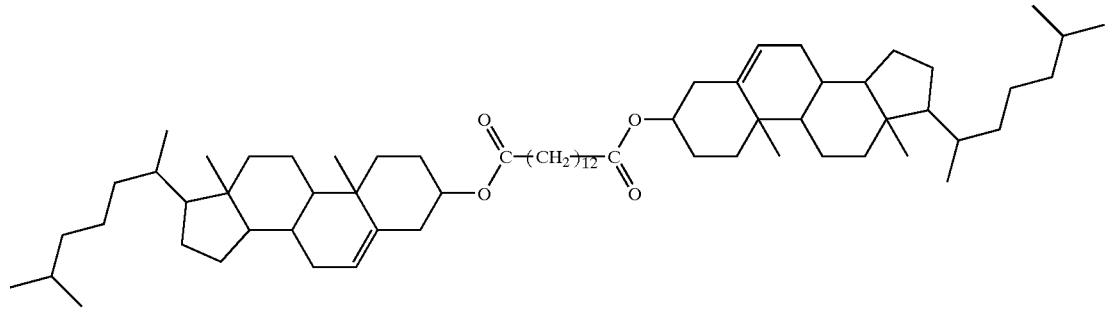

Chemical Structure (C):
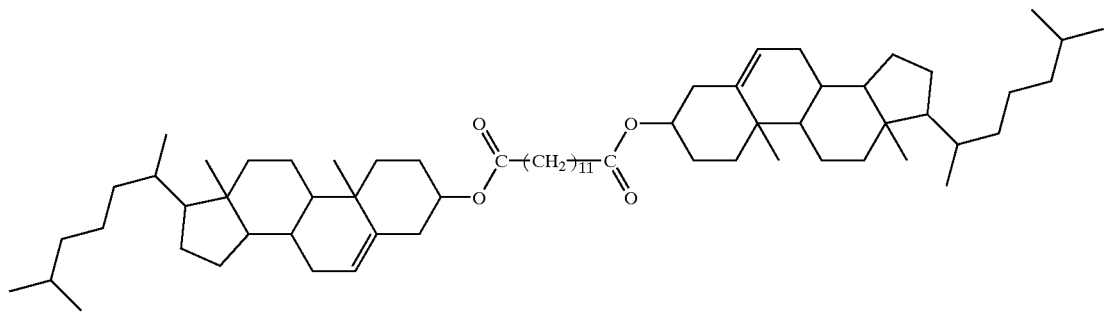
Chemical Structure (D):
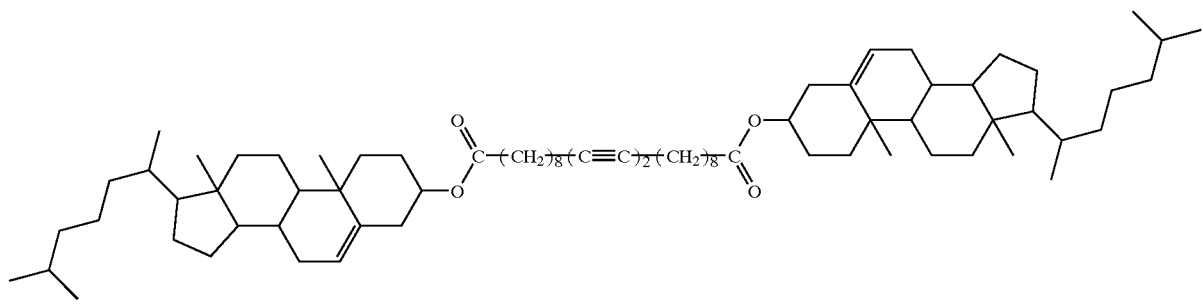
Chemical Structure (E):
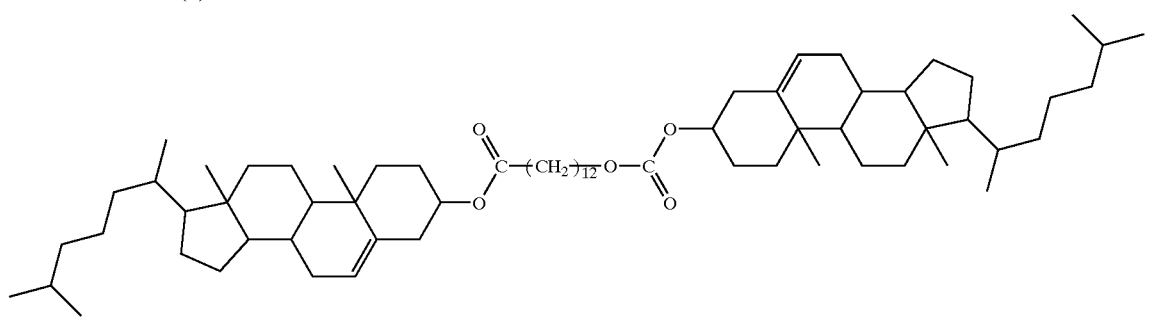
Chemical Structure (F):
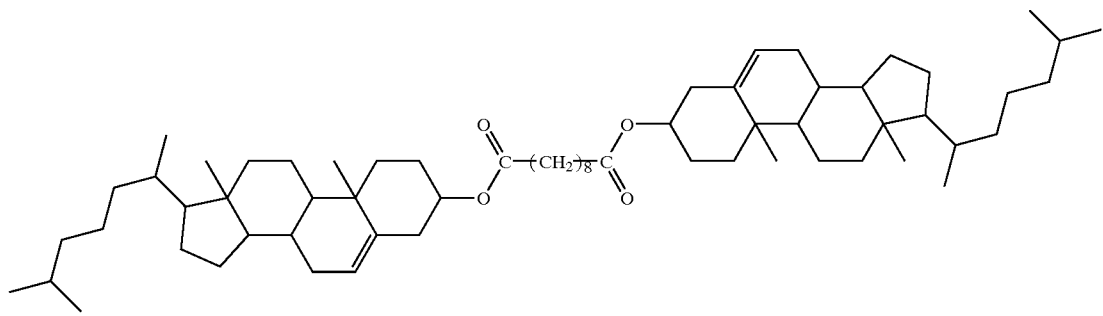

Chemical Structure (G):
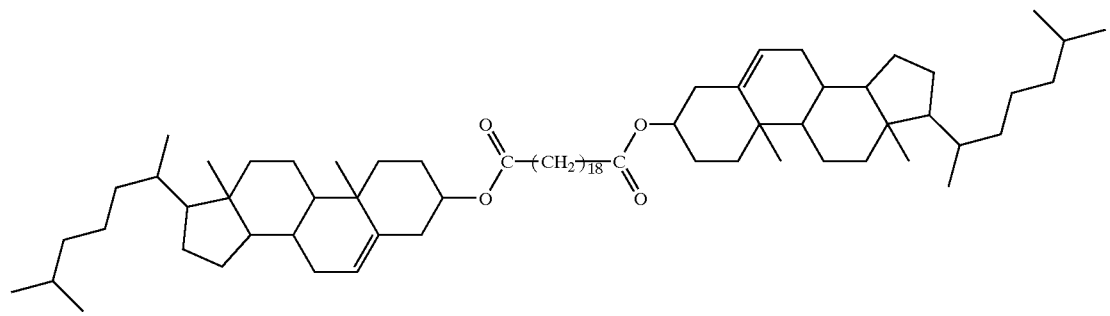
Chemical Structure (H):
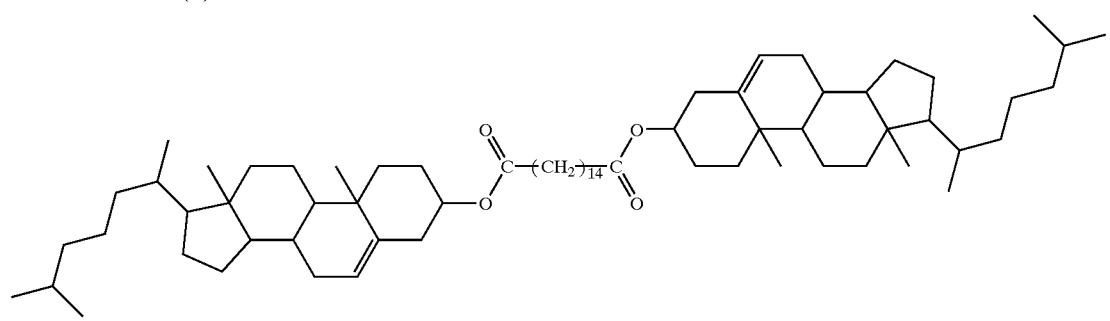
Chemical structure (I):
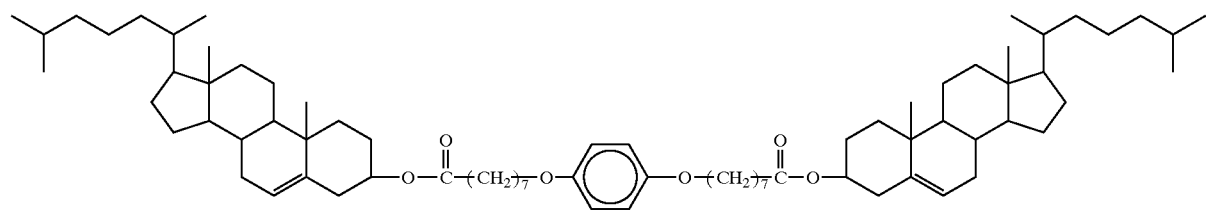
Chemical structure (J):
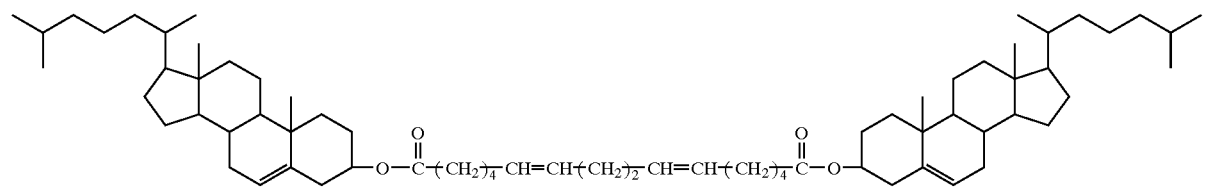
Chemical structure (K):
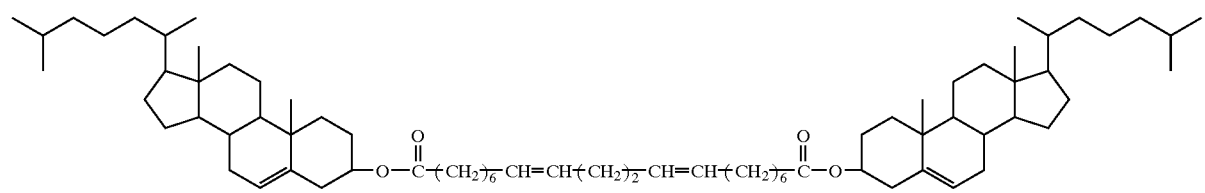

Chemical Structure (L):

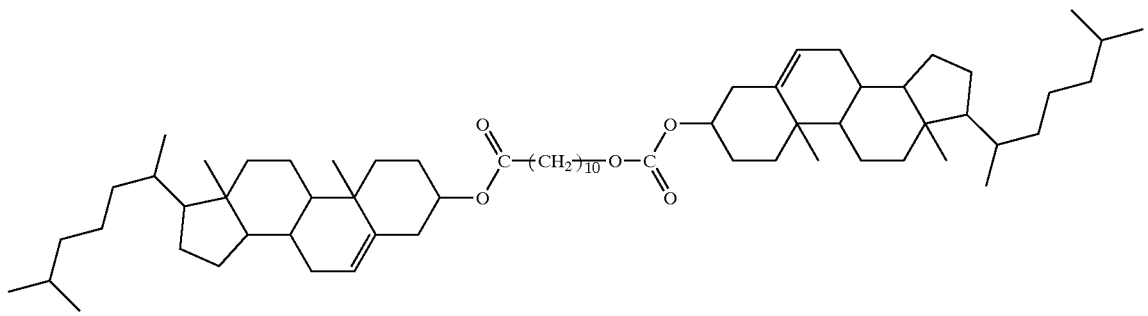

Chemical structure (M):

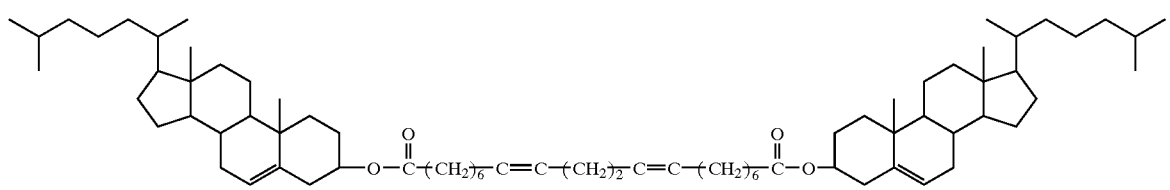

Chemical structure (N):

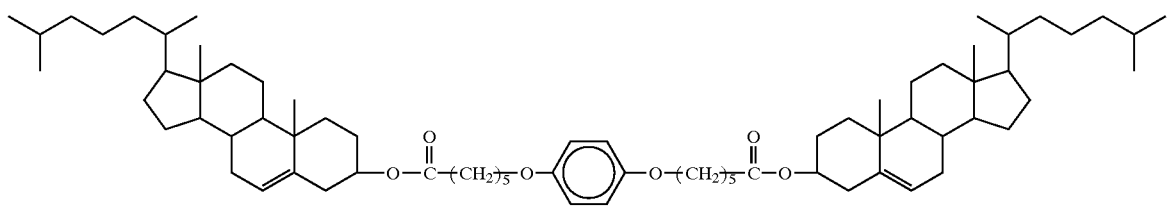

The compounds having the chemical structure (I) may be obtained by (1) having 1-bromocarboxylic acid having an alkyl chain corresponding to the length of the target compound and di-lithium diyne react with each other in an appropriate catalyst, and (2) having the compound thus obtained react with cholesterol.

The compounds having the chemical structure (II) may be obtained by having cholesterol and a dicarboxylic acid derivative having an alkyl chain corresponding to the length of the target compound react with each other in an appropriate catalysis.

The compounds having the chemical structure (III) may be obtained by following these steps: (i) perform Williamson synthesis of hydroquinon and carboxylate halide having an alkyl chain corresponding to the length of the target compound, (ii) perform hydrolysis of the product of the synthesis, and (iii) have the compound thus obtained and cholesterol condense in an appropriate catalyst.

The compounds having the chemical structure (IV) may be obtained by having cholesterol and a dicarboxlyic acid derivative having an alkynil chain corresponding to the length of the target compound react with each other in an appropriate catalysis.

The compounds having the chemical structure (V) may be obtained by having cholesterol and a dicarboxylic acid derivative having an alkynil chain corresponding to the length of the target compound react with each other in an appropriate catalysis.

The compounds having the chemical structure (VI) may be obtained by having cholesterol choloroformate and a dialcohol derivative react with each other in an appropriate catalyst.

The compounds having the chemical structure (VII) may be obtained by having cholesterol and a carboxylic acid derivative having an alkyl chain corresponding to the length of the target compound react with each other in an appropriate catalyst.

In the heat-sensitive recording medium pertaining to the present invention, the recording layer is mounted on the front surface and/or rear surface of the support member. If the support member has a specific color, display having a background of a specific color may be performed. In particular, if the support member is black, good display color may be obtained. Further, if the surface of the support member that comes into contact with the recording layer is essentially flat, the helical axes of the liquid crystal composition will be precisely oriented in the direction perpendicular to the support member, enabling display with a high reflection rate.

Furthermore, in the heat-sensitive recording medium pertaining to the present invention, spacers and polymer materials may be used in order to maintain the thickness of the recording layer. It is also acceptable to close off the edges of the recording layer using a sealing material. Protective film may be applied in order to protect the recording layer. The protective film may comprise deposition film or a polymer material. The protective film protects the recording layer from receiving external mechanical or chemical forces.

Moreover, in the heat-sensitive recording medium pertaining to the present invention, part of the recording layer may be made a non-reversible heat-sensitive recording medium area, such that specific information may be written to this area in advance. For example, if a company name or a decorative pattern is written there in advance, the recording medium may be used as a specifically formatted recording medium.

BRIEF DESCRIPTION OF THE DRAWINGS

A more complete understanding of the present invention and its advantages will be readily apparent from the following Detailed Description taken in conjunction with the accompanying drawings.

DETAILED DESCRIPTION OF THE PREFERRED EMBODIMENTS

The embodiments of the liquid crystal composition and heat-sensitive recording medium pertaining to the present invention are explained below with reference to the accompanying drawings. The embodiments and their experimental examples are explained using specific substances, but these simply comprise samples of embodiments and experimental examples. The present invention is not limited to the use of these substances, and various other materials may also be used.

The liquid crystal composition comprising one embodiment of the present invention is a liquid crystal composition including as the main ingredient a cholesteric liquid crystal compound that exhibits a cholesteric phase at temperatures higher than room temperature, wherein the liquid crystal compound reflects light in the visible light range in accordance with the temperature, and solidifies in the reflective state when it is rapidly cooled, and wherein the enthalpy $\Delta Hch$ of the liquid crystal compound during its transition from the solid phase to the cholesteric phase is constant at value A ($0 \leq A \leq 15$ mJ/mg) when the temperature increases during differential thermal analysis or differential scanning calorimetry.

Figure 6:
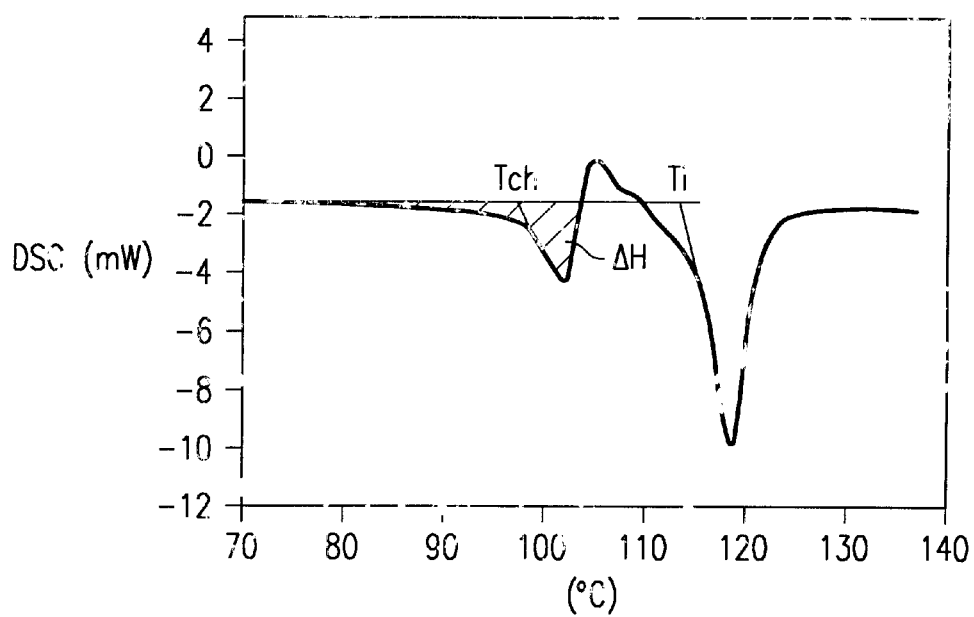
FIG. 6 is a graph showing the thermal characteristic during analysis upon temperature increase.
Figure 7:
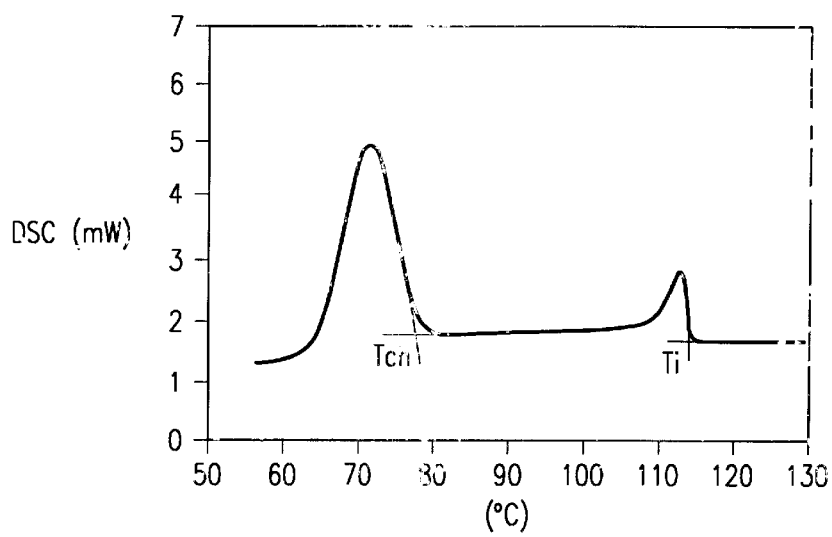
FIG. 7 is a graph showing the thermal characteristic during analysis upon temperature decrease.

The differential thermal analysis or differential scanning calorimetry is a very useful analytical means to understand the thermal characteristic of a liquid crystal composition. In this embodiment, specifically, a few milligrams of the liquid crystal composition was placed in a sample container, and measurement was taken while repeatedly increasing and decreasing the temperature of the sample in the range from $-30°$ C. to $200°$ C. Since the thermal characteristic varies from one sample to another in the first temperature increase process depending on the heating conditions for each sample, the average value of the thermal characteristic data taken from the second temperature increase process onward was used. The temperature of the sample was increased and lowered at a constant rate of $1°$ C.$-20°$ C./min. FIGS. 6 and 7 show typical results of differential scanning calorimetry performed on a liquid crystal compound of this type. FIG. 6 shows the results for the process where the temperature was increased and FIG. 7 shows the results for the process where the temperature was lowered. Normally, when the temperature increases, the glass transfer temperature (Tg), and, as shown in FIG. 6, the temperature (Tch) at which the transition from the solid phase to the cholesteric phase takes place and the temperature (Ti) at which the transition to isotropic liquid occurs are observed. The enthalpy $\Delta Hch$ during transfer from the solid phase to the cholesteric phase is measured as the area of the peak (shaded area in FIG. 6) based on the (Tch) in FIG. 6.

Figure 5:
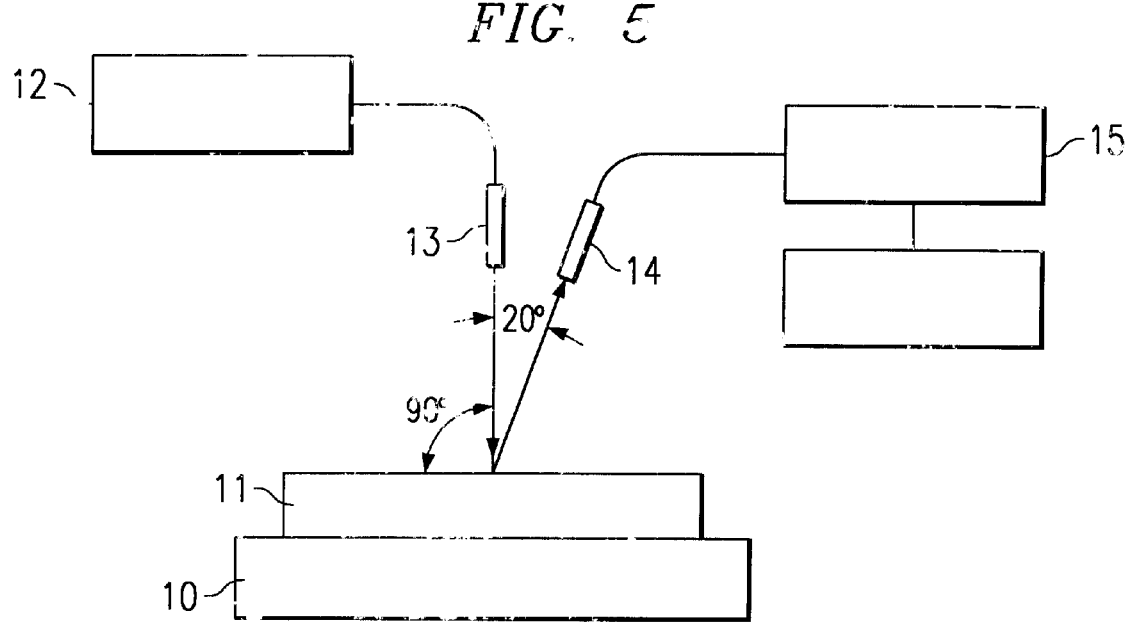
FIG. 5 is a drawing to explain the manner in which measurement was taken regarding selective reflection wavelengths in each experimental example.

The results of the experiments performed by the inventors on various liquid crystal compositions are shown below. In the experimental examples and comparison examples shown below, the selective reflection wavelength was measured by illuminating the sample 11 placed on a hot stage 10 with white light emitted from a halogen lamp 12 through an optical fiber 13 in a perpendicular fashion and by leading to a spectroscope 15 the reflected light by means of an optical fiber 14 placed at a 20-degree angle to the normal line of the sample 11, as shown in FIG. 5. In all of the experimental examples, the rising rate of temperature during the measurements was $10°$ C./min.

Experimental Example 1

A liquid crystal composition was made by mixing well the compounds having the chemical structures (A) and (B), respectively, based on a 1:1 ratio by weight. 5 mg of the mixture was taken, and measurement was taken using a differential scanning calorimeter. The average of the enthalpy ($\Delta Hch$) during the transition from the solid phase to the cholesteric phase when the temperature increased was 0 mJ/mg, based on the results of the second session onward.

Figure 8:
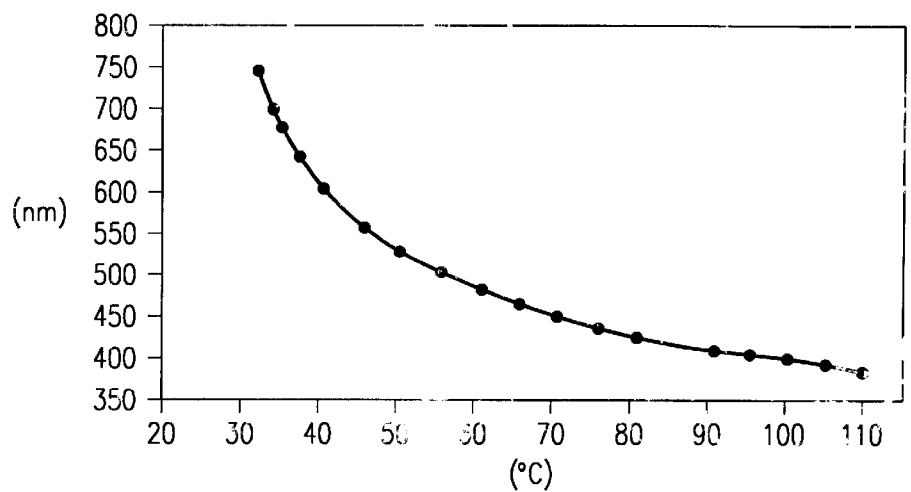
FIG. 8 is a graph showing the relationship between the temperature and the selective reflection wavelength in an experimental example 1.

This liquid crystal composition was placed between is two glass plates, and was then placed on the hot stage 10 as shown in FIG. 5. The selective reflection wave length was observed using an Otsuka Electronics MCPD multi-spectrophotometer while temperature of the hot stage 10 was increased. The graph in FIG. 8 shows the observation results. The temperature range in which the liquid crystal composition exhibited color upon the temperature increase was 90° C.

Experimental Example 2

A liquid crystal composition was made by mixing well the compounds having the chemical structures (A) and (C), respectively, based on a 1:1 ratio by weight. 5 mg of the mixture was removed, and measurement was taken using a differential scanning calorimeter. The average of the enthalpy (ΔHch) during the transition from the solid phase to the cholesteric phase when the temperature increased was 9 mJ/mg, based on the results of the second session onward.

Figure 9:
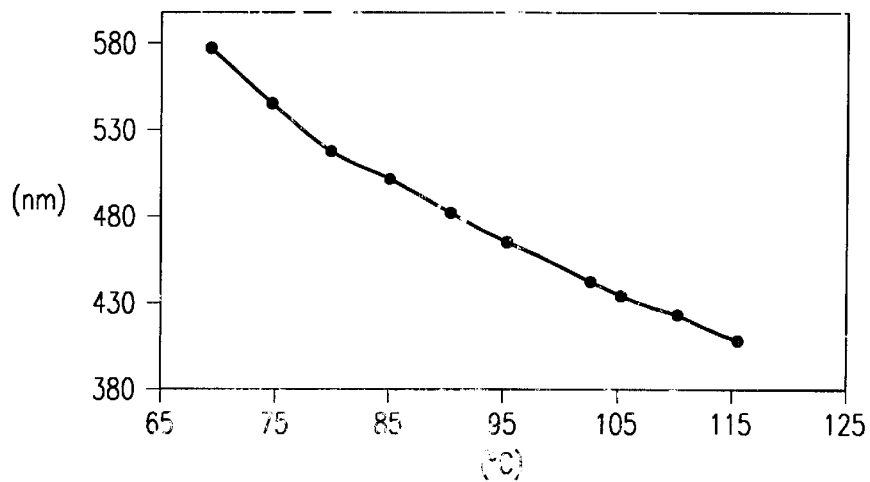
FIG. 9 is a graph showing the relationship between the temperature and the selective reflection wavelength in an experimental example 2.

This liquid crystal composition was placed between two glass plates, and was then placed on the hot stage 10 shown in FIG. 5. The selective reflection wavelength was observed using a multi-spectrophotometer while the temperature of the hot stage 10 was increased. The graph in FIG. 9 shows the observation results. The temperature range in which the liquid crystal composition exhibited color upon the temperature increase was 50° C.

Experimental Example 3

A liquid crystal composition was made by mixing well the compounds having the chemical structures (A) and (D), respectively, based on a 1:1 ratio by weight. 5 mg of the mixture was removed, and measurement was taken using a differential scanning calorimeter. The average of the enthalpy (ΔHch) during the transition from the solid phase to the cholesteric phase when the temperature increased was 0 mJ/mg, based on the results of the second session onward.

Figure 10:
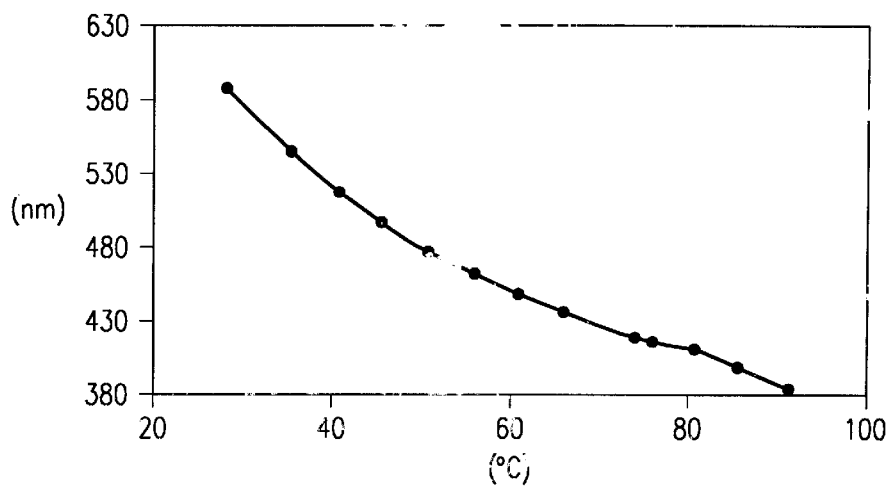
FIG. 10 is a graph showing the relationship between the temperature and the selective reflection wavelength in an experimental example 3.

This liquid crystal composition was placed between two glass plates, and was then placed on the hot stage 10 shown in FIG. 5. The selective reflection wavelength was observed using a multi-spectrophotometer while the temperature of the hot stage 10 was increased. FIG. 10 shows the observation results. The temperature range in which the liquid crystal composition exhibited color upon the temperature increase was 60° C.

Experimental Example 4

A liquid crystal composition was made by mixing well the compounds having the chemical structures (A) and (E), respectively, based on a 1:1 ratio by weight. 5 mg of the mixture was removed, and measurement was taken using a differential scanning calorimeter. The average of the enthalpy (ΔHch) during the transition from the solid phase to the cholesteric phase when the temperature increased was 14 mJ/mg, based on the results of the second session onward.

Figure 11:
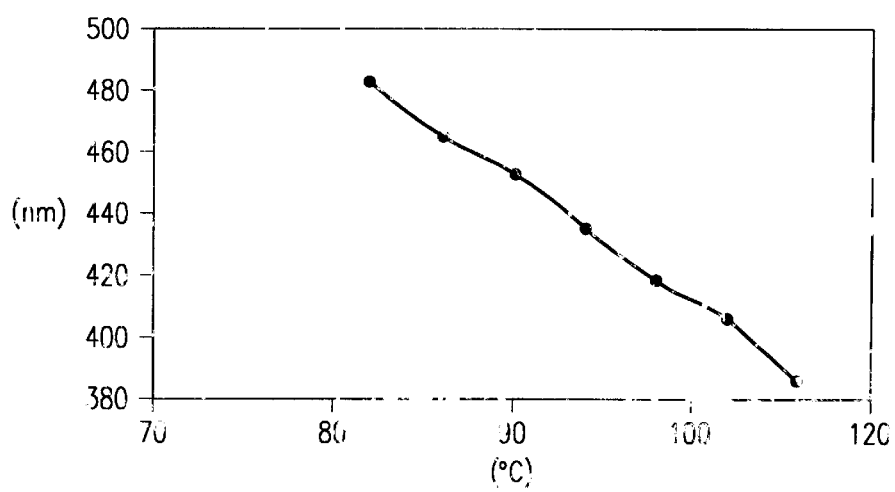
FIG. 11 is a graph showing the relationship between the temperature and the selective reflection wavelength in an experimental example 4.

This liquid crystal composition was placed between two glass plates, and was then placed on the hot stage 10 shown in FIG. 5. The selective reflection wavelength was observed using a multi-spectrophotometer while the temperature of the hot stage 10 was increased. The graph in FIG. 11 shows the observation results. The temperature range in which the liquid crystal composition exhibited color upon the temperature increase was 35° C.

Experimental Example 5

5 mg of the compound having the chemical structure (C) was taken, and measurement was performed using differential scanning calorimeter. The average of the enthalpy (ΔHch) during the transition from the solid phase to the cholesteric phase when the temperature increased was 9 mJ/mg, based on the results of the second session onward.

Figure 12:
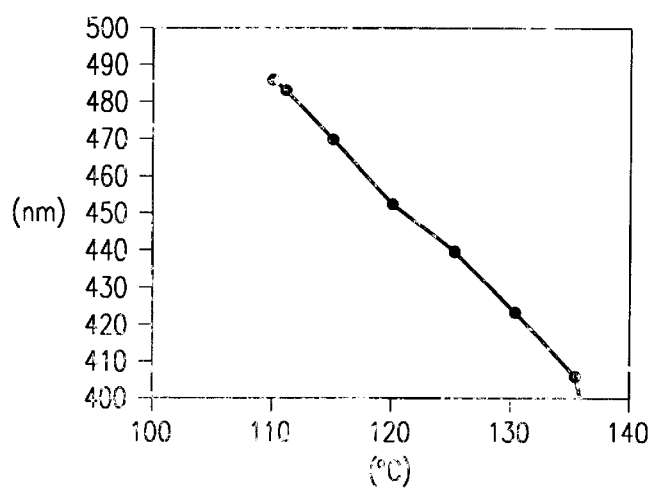
FIG. 12 is a graph showing the relationship between the temperature and the selective reflection wavelength in an experimental example 5.

This liquid crystal composition was placed between two glass plates, and was then placed on the hot stage 10 shown in FIG. 5. The selective reflection wavelength was observed using a multi-spectrophotometer while the temperature of the hot stage 10 was increased. The graph in FIG. 12 shows the observation results. The temperature range in which the liquid crystal composition exhibited color upon the temperature increase was 30° C.

Comparison Example 1

5 mg of the compound having the chemical structure (A) was taken, and measurement was performed using a differential scanning calorimeter. The average of the enthalpy (ΔHch) during the transition from the solid phase to the cholesteric phase when the temperature increased was 17 mJ/mg, based on the results of the second session onward.

Figure 13:
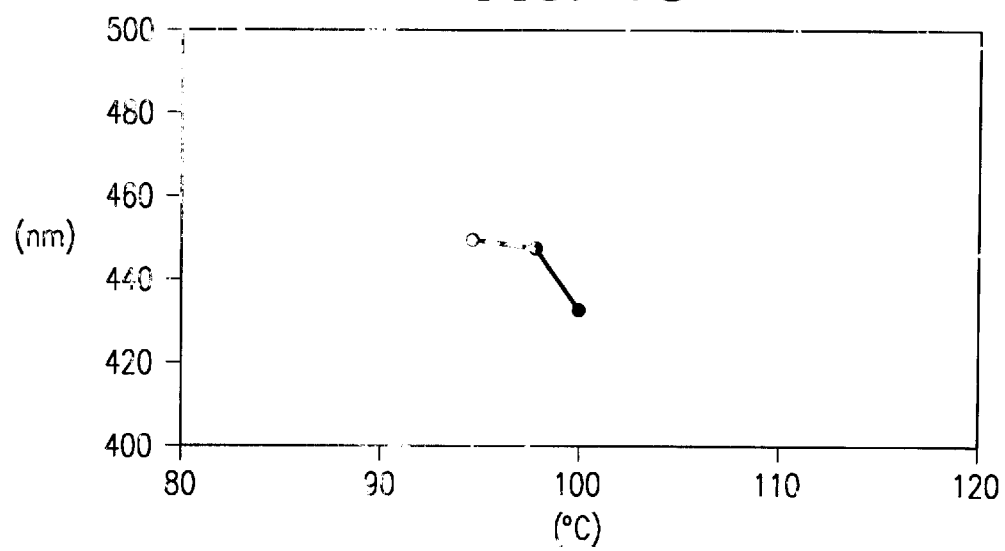
FIG. 13 is a graph showing the relationship between the temperature and the selective reflection wavelength in a comparison example 1.

This liquid crystal composition was placed between two glass plates, and was then placed on the hot stage 10 shown in FIG. 5. The selective reflection wavelength was observed using a multi-spectrophotometer while the temperature of the hot stage 10 was increased. The graph in FIG. 13 shows the observation results. It was found from the results that when the enthalpy (ΔHch) during the transition from the solid phase to the cholesteric phase when the temperature increased was large (over 15 mJ/mg), and the temperature at which the transition from the solid phase to the cholesteric phase occurred was high, the temperature range in which the liquid crystal composition exhibited color upon the temperature increase was narrow, or approximately 7° C. (434 nm to 450 nm), indicating that only limited colors could be displayed.

Heat-Sensitive Recording Medium

Figure 1:
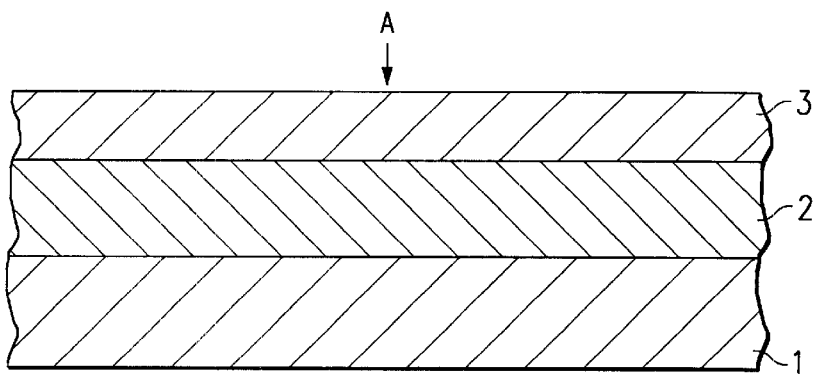
FIG. 1 is a cross-sectional view showing a first embodiment of the heat-sensitive recording medium pertaining to the present invention.

As shown in FIG. 1, the heat-sensitive recording medium comprising one embodiment of the present invention comprises a support member 1, a recording layer 2 and a protective layer 3. The support member 1 is made of plastic, glass or metal, or a composite of plastic and metal. For the support member 1, a light-absorbing material such as black polyethylene terephthalate may be used, for example.

The liquid crystal composition comprising the recording layer 2 comprises a liquid crystal composition that includes a cholesteric liquid crystal compound that exhibits a cholesteric phase at temperatures higher than room temperature, wherein the liquid crystal compound reflects light in the visible light range in accordance with the temperature, and solidifies in the reflective state when it is rapidly cooled, and wherein the enthalpy ΔHch of the liquid crystal compound during its transition from the solid phase to the cholesteric phase is constant at value A ($0 \leq A \leq 15$ mJ/mg) when the temperature increases during differential thermal analysis or differential scanning calorimetry.

The protective layer 3 comprises film on which a metal or inorganic material is deposited or film made of a polymer material, and transmits light. It is preferred that the thickness of the recording layer 2 is between 1 $\mu$m and 50 $\mu$m. More preferably, it should be between 3 $\mu$m and 30 $\mu$m.

Figure 2:
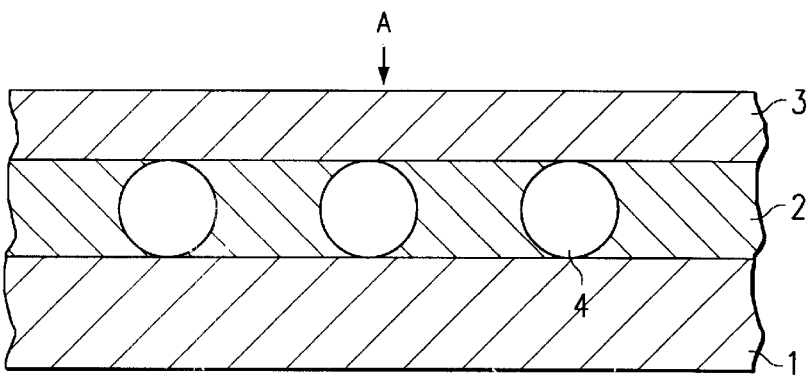
FIG. 2 is a cross-sectional view showing a second embodiment of the heat-sensitive recording medium pertaining to the present invention.
Figure 3:
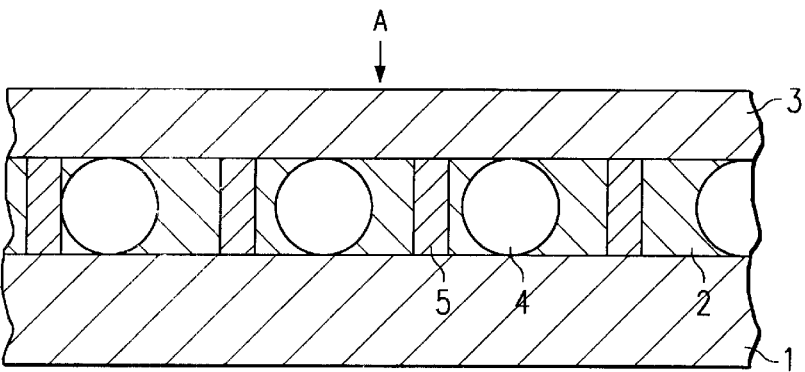
FIG. 3 is a cross-sectional view showing a third embodiment of the heat-sensitive recording medium pertaining to the present invention.
Figure 4:
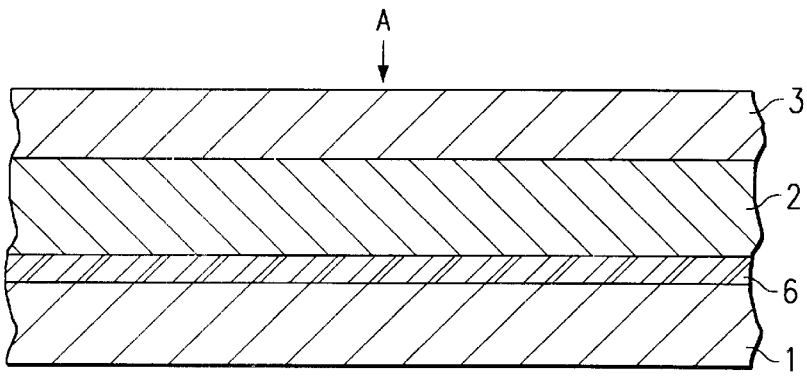
FIG. 4 is a cross-sectional view showing a fourth embodiment of the heat-sensitive recording medium pertaining to the present invention.

Another embodiment includes spacers 4 that are mixed with the liquid crystal composition in advance such that they maintain the gap between the support member 1 and the protective layer 3, as shown in FIG. 2. Alternatively, as shown in FIG. 3, the gap may be maintained using polymer bodies 5 (column bodies, for example) that are mixed with the liquid crystal composition in advance, or the polymer bodies 5 and spacers 4 may be used in combination. The recording layer 2 may comprise a composite film formed from a liquid crystal composition and a resin network. It is also acceptable if an intermediate layer 6 is placed between the recording layer 2 and the support member 1, as shown in FIG. 4. This intermediate layer 6 may comprise a light-absorbing material, a material that reflects light of a specific color, or a light-reflective material, such that display may be performed against a background of black, a specific color or a reflective surface.

Various examples of experiments performed by the inventors on the heat-sensitive medium are described below.

Experimental Example 6

Five parts by weight of the compound having the chemical structure (A) and five parts by weight of the compound having the chemical structure (B) were dissolved in 30 parts by weight of tetrahydrofuran to create an application solution. This application solution was applied onto black polyethylene terephthalate film by means of a blade and dried, whereupon a 5 μm thick heat-sensitive recording layer was obtained.

A 3 μm thick polyester film was placed on the recording layer as a protective layer, and the edges were closed off using an adhesive (Aronalfa by Toa Synthetics).

It was confirmed by means of differential scanning calorimetry that when the heat-sensitive recording medium thus made was gradually heated from room temperature to 115° C., it would exhibit, beginning at a certain temperature level, a cholesteric phase in which the helical axes of the liquid crystal compound molecules were oriented vertically relative to the support member. The recording medium reflected light of a specific wavelength in accordance with the temperature: it exhibited red at approximately 40° C., green at approximately 50° C., and blue at approximately 85° C. When it was rapidly cooled from any of those temperature levels, it solidified in the reflective state that existed at the higher temperature.

When the recording medium was heated to approximately 120° C. or higher and cooled rapidly, it became transparent. In other words, when the heat-sensitive recording medium was heated to over 120° C. by means of heat rollers, for example, and then was rapidly cooled, the entire surface of the recording layer became transparent. When this state is present, the visible light is absorbed by the black support member, and consequently, black is displayed to the observer who observes the layer in the direction of the arrow (A).

When part of the heat-sensitive recording medium was heated and cooled based ON the application and termination of voltage using a variable-temperature thermal head, the heated area exhibited a reflection color in accordance with, the heating temperature. In other words, when writing was performed by means of the thermal head at 50° C., green display against a black background was observed. When writing was selectively performed at 40° C., 50° C. and 85° C., respectively, multi-color display was possible.

In this heat-sensitive recording medium, the display color of the liquid crystal is observed against a black background. If display against a white background is desired, this can be achieved by displaying minute areas of blue, green and red in a mosaic fashion on the areas having no display information.

On the other hand, when the recording medium was heated to 120° C. or higher and then gradually cooled, it became light-scattering and opaque. In other words, when the entire surface of the heat-sensitive recording medium was heated to 120° C. or higher and then gradually cooled, the entire surface attained a light-scattering state. When this occurs, white display is observed by an observer viewing in the direction of the arrow (A). Therefore, this opaque state obtained based on heating and gradual cooling may be used as a white background.

Experimental Example 7

A heat-sensitive recording medium was obtained using the same materials, manufacturing method and construction as in the experimental example 6, except that the compound having the chemical structure (C) was used in place of the compound having the chemical structure (B) used in the experimental example 6.

It was confirmed by means of differential scanning calorimetry that when the heat-sensitive recording medium thus made was gradually heated from room temperature to 130° C., it would exhibit, beginning at a certain temperature level, a cholesteric phase in which the helical axes of the liquid crystal compound molecules were oriented vertically relative to the support member. The recording medium reflected light of a specific wavelength in accordance with the temperature: it exhibited yellow at approximately 70° C., green at approximately 90° C., and blue at approximately 120° C. When it was rapidly cooled from any of these temperature levels, it solidified in the reflective state that existed at the higher temperature.

Experimental Example 8

A heat-sensitive recording medium was obtained using the same materials, manufacturing method and construction as in the experimental example 6, except that the compound having the chemical structure (D) was used in place of the compound having the chemical structure (B) used in the experimental example 6.

It was confirmed by means of differential scanning calorimetry that when the heat-sensitive recording medium thus made was gradually heated from room temperature to 100° C., it would exhibit, beginning at a certain temperature level, a cholesteric phase in which the helical axes of the liquid crystal compound molecules were oriented vertically relative to the support member. The recording medium reflected light of a specific wavelength in accordance with the temperature: it exhibited orange at approximately 30° C., green at approximately 45° C., and blue at approximately 80° C. When it was rapidly cooled from any of these temperature levels, it solidified in the reflective state that existed at the higher temperature.

Comparison Example 2

A heat-sensitive recording medium was obtained using the same materials, manufacturing method and construction as in the experimental example 6, except that the recording layer comprised a liquid crystal composition comprising the compound having the chemical structure (A) only. When this heat-sensitive recording medium was brought to an isotropic phase and then gradually cooled, it attained an opaque state.

It was confirmed by means of differential scanning calorimetry that when the heat-sensitive recording medium thus made was gradually heated from room temperature to 120° C., it would exhibit, beginning at 95° C.—at which temperature transfer from the solid phase to the cholesteric phase occurs—a cholesteric phase in which the helical axes of the liquid crystal compound molecules were oriented vertically, relative to the support member. However, the temperature range within which this liquid crystal composition (compound (A)) exhibited color upon the temperature increase was very narrow, or 7° C. (98° C. to 105° C.). It exhibited blue at approximately 100° C., and when it was rapidly cooled from that temperature, it solidified in the reflective state that existed at the higher temperature.

Experimental Example 9

A heat-sensitive recording medium was obtained using the same materials, manufacturing method and construction as in the experimental example 6, except that an application solution made by dissolving nine parts by weight of the compound having the chemical structure (A) and one part by weight of the compound having the chemical structure (B) in 30 parts by weight of tetrahydrofuran was used.

It was confirmed by means of differential scanning calorimetry that when the heat-sensitive recording medium thus made was gradually heated from room temperature to 100° C., it would exhibit beginning at a certain temperature level, a cholesteric phase in which the helical axes of the liquid crystal compound molecules were oriented vertically relative to the support member. The recording medium reflected light of a specific wavelength in accordance with the temperature: it exhibited orange at approximately 30° C., green at approximately 45° C., and blue at approximately 80° C. When it was rapidly cooled from any of these temperature levels, it solidified in the reflective state that existed at the higher temperature.

On the other hand, when measurement was performed using a differential scanning calorimeter regarding the liquid crystal composition used in the experimental example 9 (a well-mixed mixture of nine parts by weight of the compound (A) and one part by weight of the compound (B)), the average of the enthalpy (ΔHch) during the transition from the solid phase to the cholesteric phase when the temperature increased was 10 mJ/mg, based on the results of the second session onward.

Figure 14:
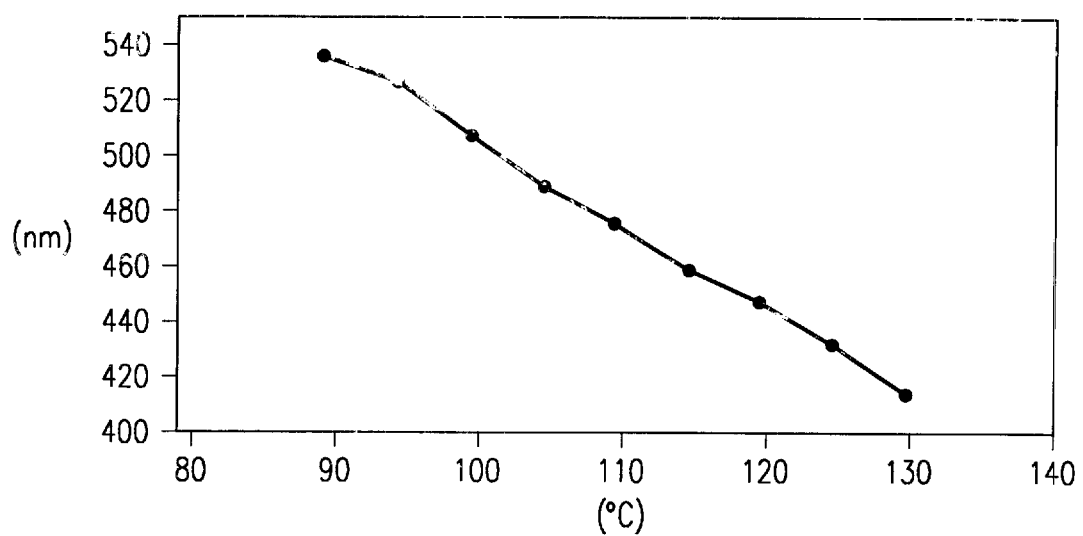
FIG. 14 is a graph showing the relationship between the temperature and the selective reflection wavelength in the liquid crystal composition used in an experimental example 9.

This liquid crystal composition was placed between two glass plates, and was then placed on the hot stage 10 shown in FIG. 5. The selective reflection wavelength was observed using a multi-spectrophotometer while the temperature of the hot stage 10 was increased. The graph in FIG. 14 shows the observation results.

Experimental Example 10

A heat-sensitive recording medium was obtained using the same materials, manufacturing method and construction as in the experimental example 6, except that one part by weight of 20 μm-diameter glass spacers were added to the liquid crystal composition used in the experimental example 6.

It was confirmed by means of differential scanning calorimetry that when the heat-sensitive recording medium thus made was gradually heated from room temperature to 115° C., it would exhibit, beginning at a certain temperature level, a cholesteric phase in which the helical axes of the liquid crystal compound molecules were oriented vertically relative to the support member. The recording medium reflected light of a specific wavelength in accordance with the temperature: it exhibited red at approximately 40° C., green at approximately 50° C., and blue at approximately 85° C. When it was rapidly cooled from any of these temperature levels, it solidified in the reflective state that existed at the higher temperature.

Experimental Example 11

A heat-sensitive recording medium was obtained using the same materials, manufacturing method and construction as in the experimental example 6, except that the support member comprised a composite material made by depositing aluminum on polyethylene terephthalate film.

It was confirmed by means of differential scanning calorimetry that when the heat-sensitive recording medium thus made was gradually heated from room temperature to 115° C., it would exhibit, beginning at a certain temperature level, a cholesteric phase in which the helical axes of the liquid crystal compound molecules were oriented vertically relative to the support member. The recording medium reflected light of a specific wavelength in accordance with the temperature: it exhibited red at approximately 40° C., green at approximately 50° C., and blue at approximately 85° C. When it was rapidly cooled from any of these temperature levels, it solidified in the reflective state that existed at the higher temperature.

Experimental Example 12

A support member was formed using a composite material made by depositing aluminum on polyethylene terephthalate film. Photoresit (THB-37 by JSR) was applied to this support member by means of a spinner, and it was then irradiated with ultraviolet rays using a photomask. Following development and rinsing, column-like bodies comprising a polymer material were formed. Other than this process, a heat-sensitive recording medium was obtained using the same materials, manufacturing method and construction as in the experimental example 6.

It was confirmed by means of differential scanning calorimetry that when the heat-sensitive recording medium thus made was gradually heated from room temperature to 115° C., it would exhibit, beginning at a certain temperature level, a cholesteric phase in which the helical axes of the liquid crystal compound molecules were oriented vertically relative to the support member. The recording medium reflected light of a specific wavelength in accordance with the temperature: it exhibited red at approximately 40° C., green at approximately 50° C., and blue at approximately 85° C. When it was rapidly cooled from any of these temperature levels, it solidified in the reflective state that existed at the higher temperature.

Experimental Example 13

A heat-sensitive recording medium was obtained using the same materials, manufacturing method and construction as in the experimental example 6, except that the compound having the chemical structure (E) was used in place of the compound having the chemical structure (B) used in the experimental example 6.

It was confirmed by means of differential scanning calorimetry that when the heat-sensitive recording medium thus made was gradually heated from room temperature to 125° C., it would exhibit, beginning at a certain temperature level, a cholesteric phase in which the helical axes of the liquid crystal compound molecules were oriented vertically relative to the support member. The recording medium reflected light of a specific wavelength in accordance with the temperature: it exhibited green at approximately 85° C. and blue at approximately 110° C. When it was rapidly cooled from any of these temperature levels, it solidified in the reflective state that existed at the higher temperature.

Experimental Example 14

A heat-sensitive recording medium was obtained using the same materials, manufacturing method and construction as in the experimental example 6, except that, instead of using polyester film for the protective layer, SiO2 film was formed on the recording layer by means of resist heating in vacuum deposition.

It was confirmed by means of differential scanning calorimetry that when the heat-sensitive recording medium thus made was gradually heated from room temperature to 115° C., it would exhibit, beginning at a certain temperature level, a cholesteric phase in which the helical axes of the liquid crystal compound molecules were oriented vertically relative to the support member. The recording medium reflected light of a specific wavelength in accordance with the temperature: it exhibited red at approximately 40° C., green at approximately 50° C., and blue at approximately 85° C. When it was rapidly cooled from any of these temperature levels, it solidified in the reflective state that existed at the higher temperature.

When the recording medium was heated to approximately 120° C. or higher and cooled rapidly, it became transparent. In other words, when the heat-sensitive recording medium was heated to over 120° C. by means of heat rollers, for example, and then was rapidly cooled, the entire surface of the recording layer became transparent. When this state is present, the visible light is absorbed by the black support member, and consequently, black is displayed to an observer that observes the layer in the direction of the arrow (A).

When part of the heat-sensitive recording medium was heated and cooled based on application and termination of voltage using a variable-temperature thermal head, the heated area exhibited a reflection color in accordance with the heating temperature. In other words, when writing was performed by means of the thermal head at 50° C., green display on a back background was observed. When writing was selectively performed at 40° C., 50° C. and 85° C., display in red, green and blue was possible, respectively.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

That which is claimed is:

1. A liquid crystal composition including at least one cholesteric liquid crystal compound that exhibits a cholesteric phase at a temperature higher than room temperature, said liquid crystal compound having the characteristic, in said cholesteric phase, of reflecting light incident thereon in the visible light range in accordance with a temperature thereof, and having the characteristic, when rapidly cooled from said cholesteric phase, of solidifying in a reflective state, wherein an enthalpy $\Delta Hch$ of the liquid crystal compound during a transition from a solid phase to said cholesteric phase is substantially constant at a value A ($0 \leq A \leq 15$ mJ/mg) during a time when a temperature thereof increases during one of differential thermal analysis and differential scanning calorimetry.

2. A liquid crystal composition in accordance with claim 1, wherein said liquid crystal composition includes a single cholesteric liquid crystal compound.

3. A liquid crystal composition in accordance with claim 1, wherein said liquid crystal composition includes a plurality of cholesteric liquid crystal compounds.

4. A liquid crystal composition in accordance with claim 1, wherein said at least one liquid crystal compound is a compound having a chemical structure selected from the group consisting of chemical structures (I) through (VII), where chemical structures (I) through (VII) have the following structures:

Chemical structure (I):

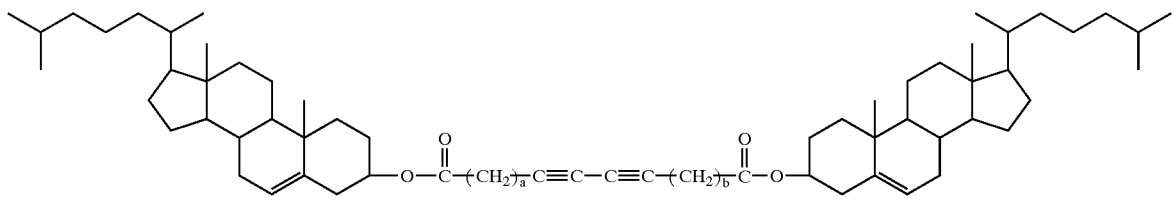

where (a) and (b) are integers such that (a+b) is 5 through 20;

Chemical structure (II):

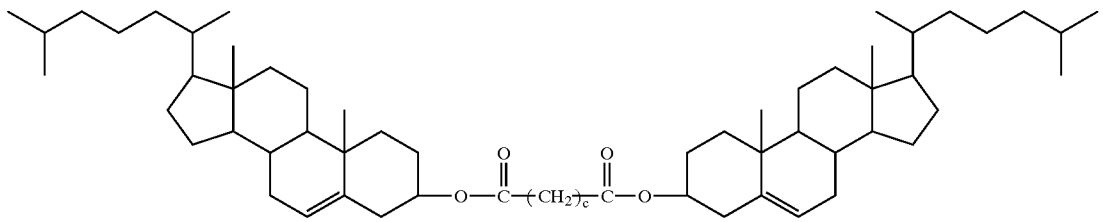

where (c) indicates an integer 5 through 20;
Chemical structure (III):
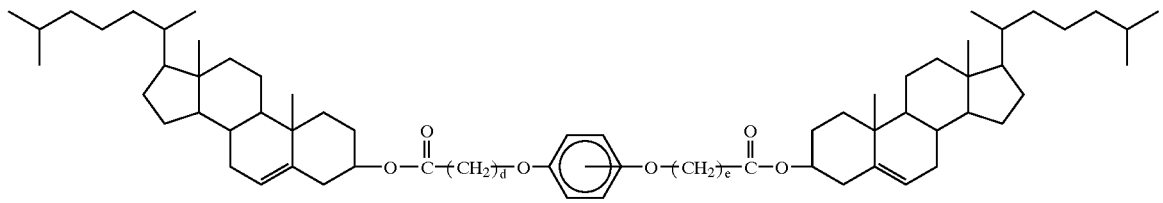
where (d) and (e) are integers such that (d+e) is 5 through 20;
Chemical structure (IV):
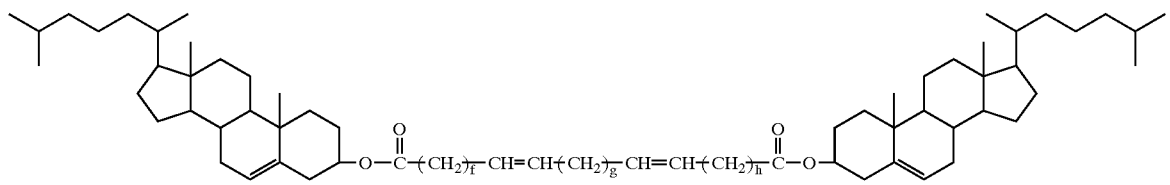
where (f), (g) and (h) are integers such that (f+g+h) is 5 through 20;
Chemical structure (V):
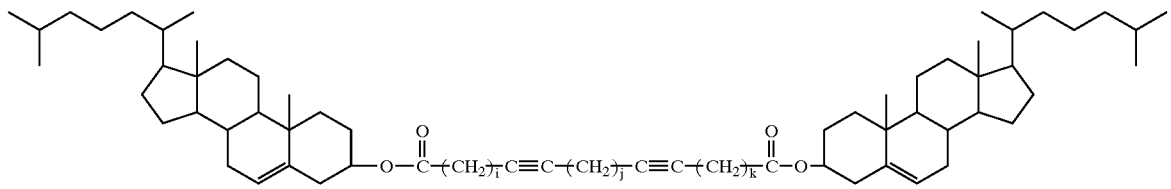
where (i), (j) and (k) are integers such that (i+j+k) is 5 through 20, excluding the case where (j) is 0;
Chemical structure (VI):
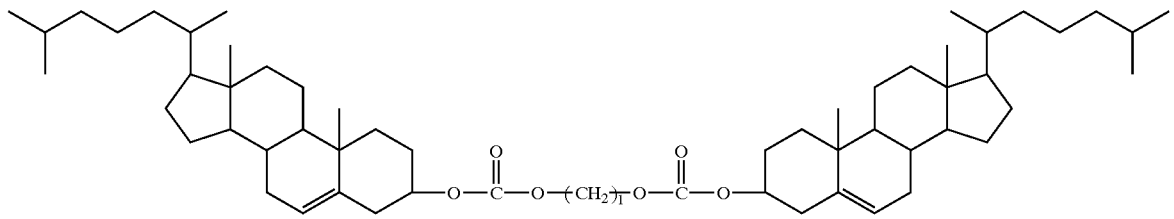

where (l) indicates an integer 5 through 20; and

Chemical structure (VII):

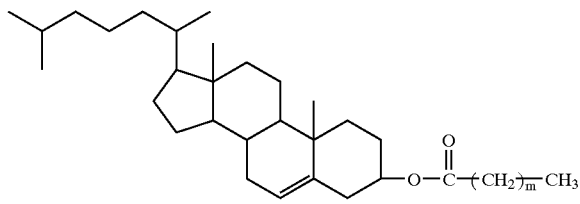

where (m) indicates an integer 5 through 20.

5. A liquid crystal composition in accordance with claim 4, wherein said at least one liquid crystal compound includes a plurality of compounds, each of said plurality of compounds: having a chemical structure selected from the group consisting of chemical structures (I) through (VII).

6. A heat-sensitive recording medium having a recording layer which includes a cholesteric liquid crystal compound that exhibits a cholesteric phase at a temperature higher than room temperature, said liquid crystal compound having the characteristic, in said cholesteric phase, of reflecting light incident thereon in the visible light range in accordance with a temperature thereof, and having the characteristic, when rapidly cooled from said cholesteric phase, of solidifying in a reflective state, wherein an enthalpy ΔHch of the liquid crystal compound during a transition from a solid phase to said cholesteric phase is substantially constant at a value A ($0 \leq A \leq 15$ mJ/mg) during a time when a temperature thereof increases during one of differential thermal analysis and differential scanning calorimetry.

7. A heat-sensitive recording medium in accordance with claim 6, wherein said recording medium includes a supporting member for supporting the recording layer and protective film for protecting the recording layer.

8. A heat-sensitive recording medium in accordance with claim 7, further comprising a film thickness maintaining means for maintaining a thickness of the recording layer.

9. A heat-sensitive recording medium in accordance with claim 8, wherein the film thickness maintaining means comprises spacers placed in the recording layer.

10. A heat-sensitive recording medium in accordance with claim 8, wherein the film thickness maintaining means comprises high molecular weight polymer bodies contained in the recording layer.

11. A heat-sensitive recording medium in accordance with claim 6, wherein the liquid crystal composition includes at least two cholesteric liquid crystal compounds.

12. A heat-sensitive recording medium in accordance with claim 6, wherein the liquid crystal composition includes a single cholesteric liquid crystal compound.

13. A heat-sensitive recording medium comprising:

a supporting member;

a recording layer, disposed on said supporting member, said recording layer including a cholesteric liquid crystal compound having the characteristic of exhibiting a solid phase for at least a first temperature range and exhibiting a cholesteric phase for a temperature range higher than said first temperature range;

a protecting layer, disposed on said recording layer on a side opposite said supporting member, for protecting the recording layer;

wherein said liquid crystal compound has the characteristic, in said cholesteric phase, of reflecting light incident thereon in the visible light range, a wavelength of light reflected therefrom varying in accordance with a temperature of said liquid crystal compound, said liquid crystal compound having the characteristic, when rapidly cooled from said cholesteric phase, of solidifying in a reflective state, wherein an enthalpy ΔHch of the liquid crystal compound during a transition from a solid phase to said cholesteric phase is substantially constant at a value A ($0 \leq A \leq 15$ mJ/mg) during a time when a temperature thereof increases during one of differential thermal analysis and differential scanning calorimetry.

14. A liquid crystal composition including a plurality of liquid crystal compounds, each liquid crystal compound of said plurality of liquid crystal compounds being a compound having a chemical structure selected from the group consisting of chemical structures (I) through (VII) defined as follows:

Chemical structure (I):

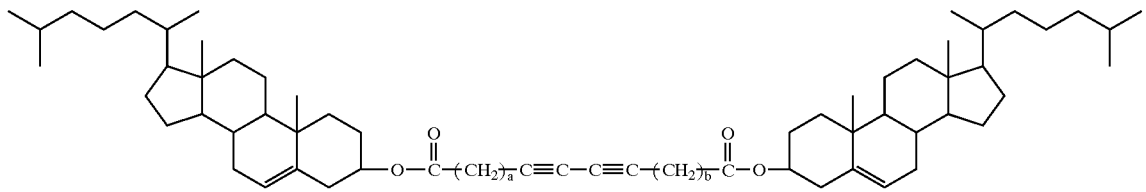

where (a) and (b) are integers such that (a+b) is 5 through 20;
Chemical structure (II):
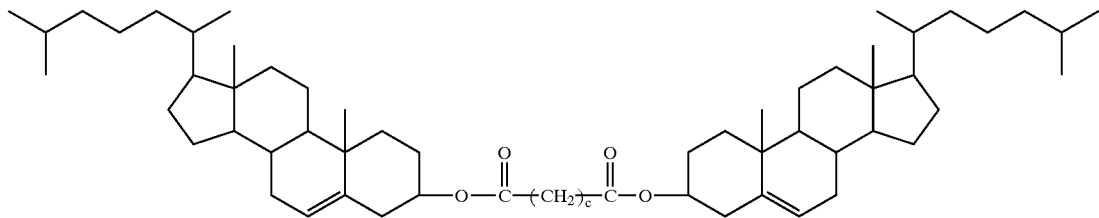
where (c) indicates an integer 5 through 20;
Chemical structure (III):
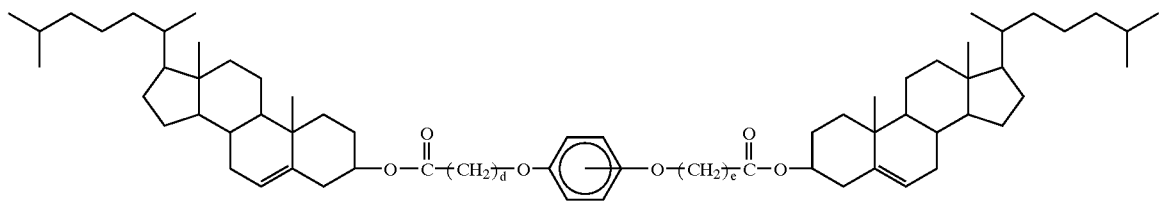
where (d) and (e) are integers such that (d+e) is 5 through 20;
Chemical structure (IV):
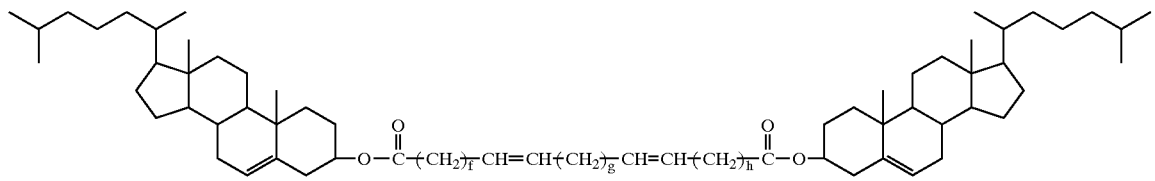
where (f), (g) and (h) are integers such that (f+g+h) is 5 through 20;
Chemical structure (V):
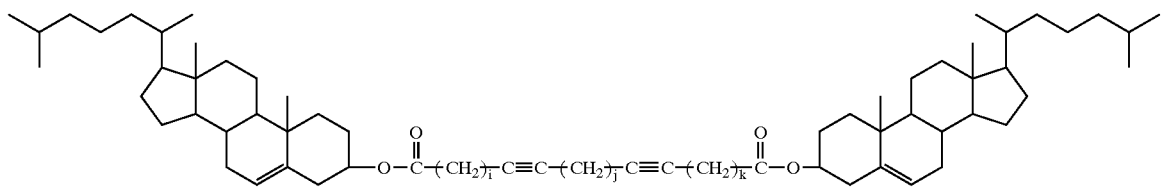

where (i), (j) and (k) are integers such that (i+j+k) is 5 through 20, excluding the case where (j) is 0;

Chemical structure (VI):

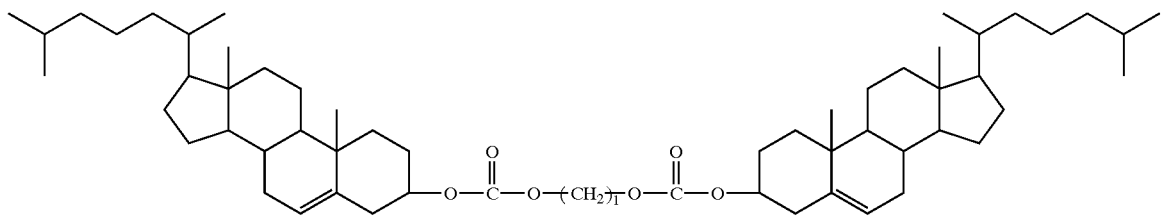

where (l) indicates an integer 5 through 20; and

Chemical structure (VII):

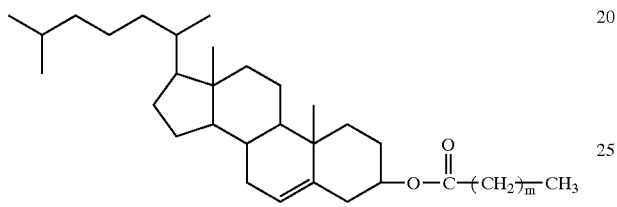

where (m) indicates an integer 5 through 20.

15. A liquid crystal composition including at least one liquid crystal compound, said at least one liquid crystal compound being a compound having a chemical structure selected from the group consisting of chemical structures (I) through (VI) defined as follows:

Chemical structure (I):

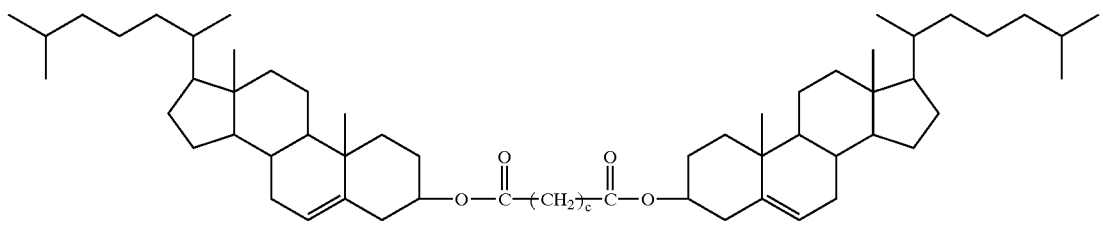

where (c) indicates an integer 5 through 20;

Chemical structure (II):

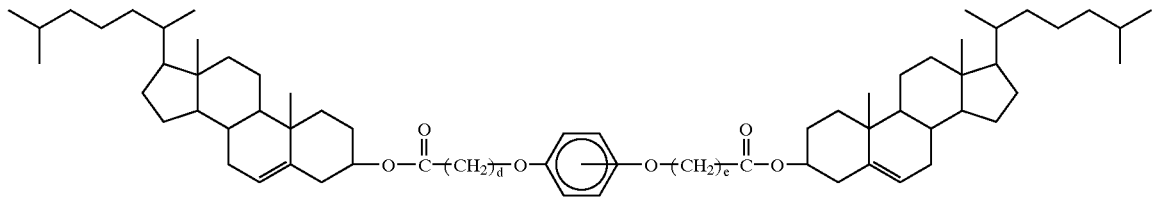

where (d) and (e) are integers such that (d+e) is 5 through 20;

Chemical structure (III):

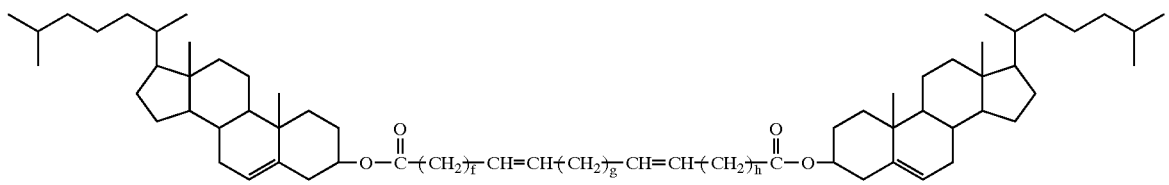

where (f), (g) and (h) are integers such that (f+g+h) is 5 through 20;

Chemical structure (IV):

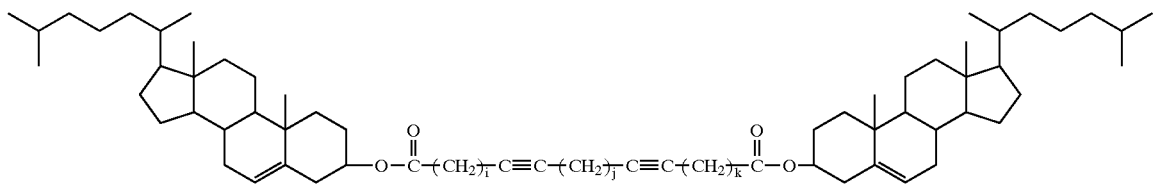

where (i), (j) and (k) are integers such that (i+j+k) is 5 through 20, excluding the case where (j) is 0;

Chemical structure (V):

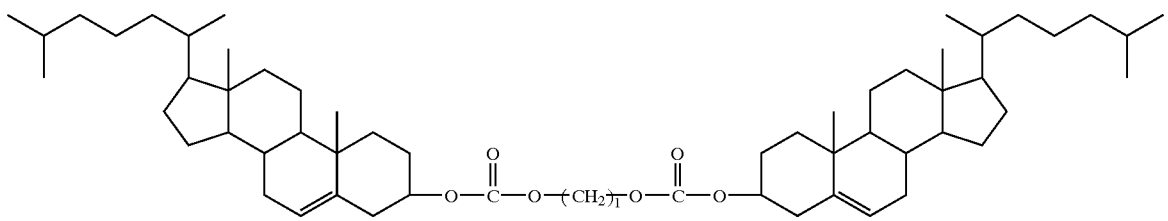

where (l) indicates an integer 5 through 20; and

Chemical structure (VI):

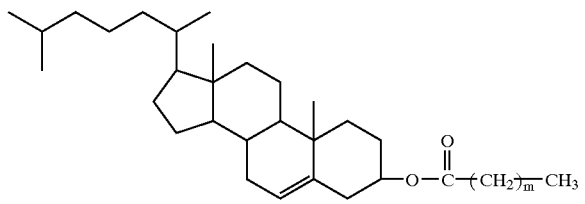

where (m) indicates an integer 5 through 20.

wherein said at least one liquid crystal compound has the characteristic, in said cholesteric phase, of reflecting light incident thereon in the visible light range, a wavelength of light reflected therefrom varying in accordance with a temperature of said liquid crystal compound, said liquid crystal compound having the characteristic, when rapidly cooled from said cholesteric phase, of solidifying in a reflective state, and wherein an enthalpy $\Delta H_{ch}$ of the liquid crystal compound during a transition from a solid phase to said cholesteric phase is substantially constant at a value A ($0 \leq A \leq 15$ mJ/mg) during a time when a temperature thereof increases during one of differential thermal analysis and differential scanning calorimetry.

* * * * *